(12) United States Patent
Park et al.

(10) Patent No.: US 11,830,165 B2
(45) Date of Patent: Nov. 28, 2023

(54) METHOD AND APPARATUS FOR SIMULTANEOUSLY ACQUIRING SUPER-RESOLUTION IMAGE AND HIGH-SPEED WIDEFIELD IMAGE

(71) Applicant: UNIST(ULSAN NATIONAL INSTITUTE OF SCIENCE AND TECHNOLOGY), Ulsan (KR)

(72) Inventors: Chung Hun Park, Ulsan (KR); Tae Seong Woo, Ulsan (KR)

(73) Assignee: UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 273 days.

(21) Appl. No.: 17/392,716

(22) Filed: Aug. 3, 2021

(65) Prior Publication Data

US 2022/0164925 A1    May 26, 2022

(30) Foreign Application Priority Data

Nov. 24, 2020 (KR) .......................... 10-2020-0159185

(51) Int. Cl.
*G06T 7/20* (2017.01)
*G06T 3/40* (2006.01)
(Continued)

(52) U.S. Cl.
CPC .......... *G06T 3/4053* (2013.01); *G02B 21/367* (2013.01); *G02B 27/58* (2013.01);
(Continued)

(58) Field of Classification Search
CPC ..................... G06T 3/4053; G06T 7/20; G06T 2207/10056; G06T 2207/10152; G02B 21/367; G02B 27/58
See application file for complete search history.

(56) References Cited

U.S. PATENT DOCUMENTS

| | | | | |
|---|---|---|---|---|
| 8,982,232 B2 * | 3/2015 | Kobayashi | ........... | H04N 25/674 348/222.1 |
| 10,539,772 B2 * | 1/2020 | Keller | .................... | G02B 21/10 |

(Continued)

FOREIGN PATENT DOCUMENTS

| | | | | |
|---|---|---|---|---|
| KR | 20180081657 A | | 7/2018 | |
| KR | 20200026202 A | | 3/2020 | |
| WO | WO-2010038941 A2 * | | 4/2010 | ........... G06T 3/4053 |

OTHER PUBLICATIONS

Woo et al., "Tunable SIM: observation at varying spatiotemporal resolutions across the FOV," Optica, vol. 7, No. 8, Aug. 2020.

*Primary Examiner* — Shefali D Goradia
(74) *Attorney, Agent, or Firm* — Hoffman Warnick LLC

(57) ABSTRACT

A method and apparatus for simultaneously acquiring a super-resolution image and a high-speed widefield image are disclosed. The image acquisition method includes receiving a first image signal from an optical microscope, generating, by using the first image signal, a first plurality of entire images, distinguishing, based on movements of a plurality of objects included in the first plurality of entire images, a dynamic region with respect to the first plurality of entire images and a static region with respect to the first plurality of entire images, and controlling the optical microscope so as to respectively irradiate lights having different amplitudes onto the dynamic region and the static region.

14 Claims, 5 Drawing Sheets

(51) Int. Cl.
*G02B 27/58* (2006.01)
*G02B 21/36* (2006.01)

(52) U.S. Cl.
CPC ...... *G06T 7/20* (2013.01); *G06T 2207/10056* (2013.01); *G06T 2207/10152* (2013.01)

(56) References Cited

U.S. PATENT DOCUMENTS

| | | | |
|---|---|---|---|
| 10,955,653 B2* | 3/2021 | Stoppe | G02B 21/244 |
| 2008/0144967 A1* | 6/2008 | Struyk | G09G 3/20 |
| | | | 382/276 |
| 2018/0074306 A1* | 3/2018 | Visscher | G02B 21/367 |

* cited by examiner

METHOD AND APPARATUS FOR SIMULTANEOUSLY ACQUIRING SUPER-RESOLUTION IMAGE AND HIGH-SPEED WIDEFIELD IMAGE

This application claims the benefit of Korean Patent Application No. 10-2020-0159185, filed on Nov. 24, 2020, in the Korean Intellectual Property Office, the disclosure of which is incorporated herein by reference.

BACKGROUND

1. Field of the Invention

Example embodiments relate to a method and apparatus for simultaneously acquiring a super-resolution image and a high-speed widefield image.

2. Description of the Related Art

In a microscope objective lens, a resolution of an acquired image is improved as spatial resolution is increased, and accordingly a more detailed structure is observable. Since a general optical microscope observes a material by using visible light, there is a limit on the spatial resolution (a diffraction limit) defined by a numerical aperture and a wavelength.

An optical microscope may obtain high spatial resolution by using a lens with a large numerical aperture or by irradiating light with a wavelength shorter than that of visible light such as an ultraviolet ray or an electron beam. However, the optical microscope has a physical limit in increasing the numerical aperture of the lens. In addition, when a measurement method using light with a short wavelength is used, it is much more complicated in terms of implementation than using the optical microscope in a visible region, and it is difficult to prepare a sample. In particular, the measurement method using light with a short wavelength may not replace the optical microscope in that it is difficult to observe cells in their native state because the high energy of short wavelength light can damage living cells.

A fluorescence microscope has an advantage of being capable of selectively acquiring an image of a region desired to be observed in a specific organelle within a cell by using a fluorescent protein, dye, or probe. However, the fluorescence microscope has a limit of spatial resolution because a diffraction limit is applied in the same manner as the general optical microscope. In order to overcome the limit of spatial resolution of the fluorescent microscope, super-resolution fluorescence microscopy techniques such as a single molecular localization microscopy (SMLM) or a stimulated emission depletion (STED) microscopy has been developed.

A structured illumination microcope (SIM) has superior temporal resolution in comparison to the SMLM or the STED microscopy. However, SIM still requires a plurality of images to construct one super-resolution image. Accordingly, when the spatial resolution is increased, the temporal resolution of an entire image decreases in the same manner as other super-resolution fluorescence microscopy.

SUMMARY

Aspects provides a technology capable of simultaneously improving spatial resolution and temporal resolution by controlling an amplitude of light irradiated within one piece of image in a spatially different manner.

However, the technical issue is not limited to the above-described technical issues, and other technical issues may exist.

According to an aspect, there is provided an image acquisition method including receiving a first image signal from an optical microscope, generating, by using the first image signal, a first plurality of entire images, distinguishing, based on movements of a plurality of objects included in the first plurality of entire images, a dynamic region with respect to the first plurality of entire images and a static region with respect to the first plurality of entire images, and controlling the optical microscope so as to respectively irradiate lights having different amplitudes onto the dynamic region and the static region.

The image acquisition method may further include generating a mask for distinguishing the dynamic region and the static region by using two consecutive images among the first plurality of entire images.

The image acquisition method may further include receiving, from the optical microscope, a second image signal acquired by respectively irradiating lights having different amplitudes irradiated onto the dynamic region and the static region, generating, by using the second image signal, a second plurality of entire images, generating, based on the second plurality of entire images and the mask, a plurality of static region images representing only the static region and a dynamic region image representing only the dynamic region, and generating, based on the plurality of static region images and the dynamic region image, a final image with respect to the plurality of objects.

The generating of the final image may include generating, by using the plurality of static region images, a super-resolution image with respect to the static region, and generating, by using the super-resolution image and the dynamic region image, the final image.

The generating may include controlling the optical microscope so as to irradiate a light with a plane wave pattern onto the dynamic region, and controlling the optical microscope so as to irradiate a light with a sinusoidal wave pattern onto the static region.

The light may be a light having an electromagnetic wave form in a predetermined wavelength range.

The first image signal may be acquired by irradiating light with a plane wave pattern from the optical microscope.

The optical microscope may be implemented as a digital micro-mirror device (DMD), a liquid crystal-based optical modulator, a micro electro mechanical systems (MEMS)-based optical modulator, or an LED.

According to another aspect, there is provided an image acquisition apparatus including a memory configured to store instructions for simultaneously acquiring a super-resolution image and a high-speed widefield image, and a processor configured to execute the instructions. When the instructions are executed by the processor, the processor may be configured to receive a first image signal from an optical microscope, generate, by using the first image signal, a first plurality of entire images, distinguish, based on movements of a plurality of objects included in the first plurality of entire images, a dynamic region with respect to the first plurality of entire images and a static region with respect to the first plurality of entire images, and control the optical microscope so as to respectively irradiate lights having different amplitudes onto the dynamic region and the static region.

The processor may be configured to generate a mask for distinguishing the dynamic region and the static region by using two consecutive images among the first plurality of entire images.

The processor may be configured to receive, from the optical microscope, a second image signal acquired by respectively irradiating lights having different amplitudes onto the dynamic region and the static region, generate, by using the second image signal, a second plurality of entire images, generate, based on the second plurality of entire images and the mask, a plurality of static region images representing only the static region and a dynamic region image representing only the dynamic region, and generate, based on the plurality of static region images and the dynamic region image, a final image with respect to the plurality of objects.

The processor may be configured to generate, by using the plurality of static region images, a super-resolution image with respect to the static region, and generate the final image by using the super-resolution image and the dynamic region image.

The processor may be configured to control the optical microscope so as to irradiate a light with a plane wave pattern onto the dynamic region, and control the optical microscope so as to irradiate a light with a sinusoidal wave pattern onto the static region.

The light may be a light having an electromagnetic wave form in a predetermined wavelength range.

The first image signal may be acquired by irradiating light with a plane wave pattern from the optical microscope.

The optical microscope may be implemented as a DMD, a liquid crystal-based optical modulator, a MEMS-based optical modulator, or an LED.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
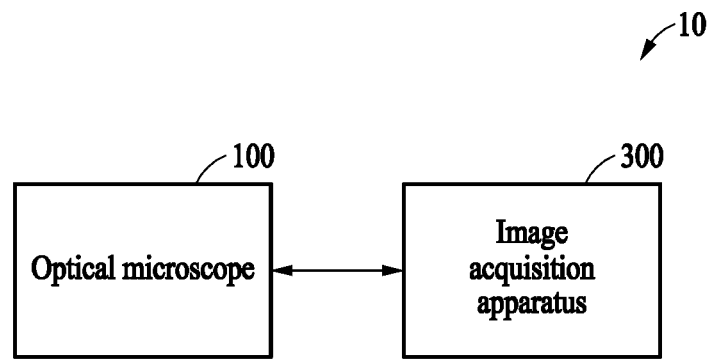
FIG. 1 is a diagram illustrating an image acquisition system according to an example embodiment.

The following structural or functional descriptions are exemplary to merely describe example embodiments, and the scope of the example embodiments is not limited to the descriptions provided in the present specification. Various changes and modifications can be made to the example embodiments by one skilled in the art.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second to component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component.

As used herein, the singular forms "a," "an," and "the," are intended to include the plural forms as well, unless the context clearly indicates otherwise. It will be further understood. that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood by one skilled in the art to which the example embodiments pertain. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, example embodiments are described in detail with reference to the accompanying drawings. The same reference numerals in each drawing indicate the same members. Regarding the reference numerals assigned to the components in the drawings, it should be noted that the same components will be designated by the same reference numerals, wherever possible, even though they are shown in different drawings, and duplicated description thereof will be omitted.

FIG. 1 is a diagram illustrating an image acquisition system according to an example embodiment.

An image acquisition system 10 may include an optical microscope 100 and an image acquisition apparatus 300.

The image acquisition system 10 may simultaneously measure life phenomena with different space-time scales within one image in the same system.

The image acquisition system 10 may eliminate a cancellation effect in which any one of space-time resolution needs to be sacrificed. The image acquisition system 10 may apply a super-resolution image and a super-speed image to other regions in the image, as necessary. The image acquisition system 10 may be effective in a research related to a microfluidic channel, a research field that requires observation of life and physical phenomena such as calcium signal transmission that requires high temporal resolution, and observation of a system in which a microstructure change and macroscopic rapid dynamics coexist.

The optical microscope 100 may irradiate a light onto an observation target. The optical microscope 100 may irradiate lights having different amplitudes depending on a region of the observation target. The optical microscope 100 may irradiate a light in response to a control signal received from the image acquisition apparatus 300. For example, the optical microscope 100 may irradiate a light in a visible region. The optical microscope 100 may irradiate a light having an electromagnetic wave form in a predetermined wavelength range (for example, all wavelengths) other than the visible region. The optical microscope 100 may irradiate a light with a plane wave pattern. The optical microscope 100 may irradiate a light with a sine wave pattern. The optical microscope 100 may be implemented as a digital micro-mirror device (DMD), a liquid crystal-based optical modulator, a micro electro mechanical systems (MEMS)-based optical modulator, or an LED. The optical microscope 100 may be implemented to irradiate a light having an electromagnetic form with various wavelengths.

The optical microscope 100 may transmit an image signal acquired through the irradiated light to the image acquisition apparatus 300. For example, the optical microscope 100 may acquire a first image signal by irradiating a light with a plane wave pattern. The optical microscope 100 may transmit the first image signal to the image acquisition apparatus 300. The optical microscope 100 may irradiate lights having different amplitudes onto at least two regions of the observation target, based on a control signal received from the image acquisition apparatus 300. The optical microscope 100 may acquire a second image signal by irradiating the lights having different amplitudes onto at least two regions of the observation target. The optical microscope 100 may transmit the second image signal to the image acquisition apparatus 300.

The image acquisition apparatus 300 may enable observation with spatial resolution corresponding to a diffraction limit with respect to a region that is not observable due to an artifact generated by an observation target that moves or has a changing shape when constructing a super-resolution image.

With respect to a target that moves or is deformed while the number of pieces of image required to construct a super-resolution image of a structured illumination microscopy (SIM) is acquired, the image acquisition apparatus 300 may track a position and a shape of the target at the moment each image is acquired with the spatial resolution corresponding to the diffraction limit.

The image acquisition apparatus 300 may control the optical microscope 100 so as to respectively irradiate lights having different amplitudes depending on a region of the observation target. The image acquisition apparatus 300 may improve spatial resolution and/or temporal resolution within one piece of image depending on a required region. The image acquisition apparatus 300 may simultaneously acquire a super-resolution image and a high-speed widefield image depending on a region of the observation target, and output the acquired images to a user.

Figure 2:
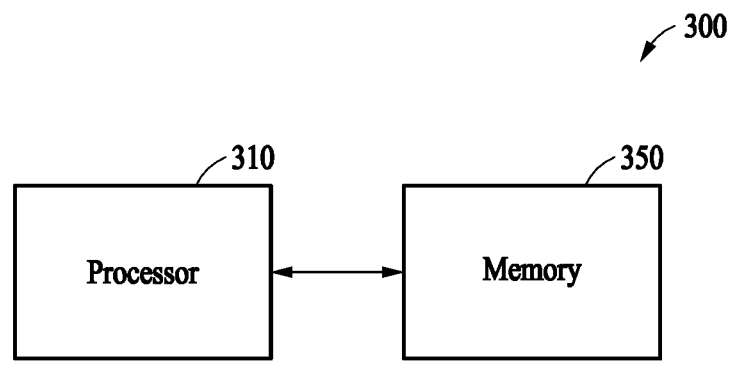
FIG. 2 is a diagram schematically illustrating the image acquisition apparatus illustrated in FIG. 1.

FIG. 2 is a diagram schematically illustrating the image acquisition apparatus illustrated in FIG. 1.

The image acquisition apparatus 300 may include a processor 310 and a memory 350.

The processor 310 may include one or more of a central processing unit, an application processor, and a communication processor.

The processor 310 may execute an operation with respect to control of at least one of other components of the image acquisition apparatus 300, or data processing. For example, the processor 310 may execute an application and/or software stored in the memory 350.

The processor 310 may process received data and data stored in the memory 350. The processor 310 may process data stored in the memory 350. The processor 310 may execute computer-readable code (for example, software) stored in the memory 350 and instructions induced by the processor 310.

The processor 310 may be a data processing unit implemented in hardware having a circuit with a physical structure for executing desired operations. For example, the desired operations may include code or instructions included in a program.

For example, the data processing unit implemented in hardware may include a microprocessor, a central processing unit, a processor core, a multi-core processor, a multiprocessor, an application-specific integrated circuit (ASIC), and a field programmable gate array (FPGA).

The processor 310 may receive a first image signal from the optical microscope 100. For example, the first image signal may be an image signal acquired by irradiating a light with a plane wave pattern from the optical microscope 100.

The processor 310 may generate a first plurality of entire images by using the first image signal. For example, the first plurality of entire images may represent images including the entire acquired by irradiating a light with a plane wave pattern onto an observation target.

The processor 310 may distinguish a dynamic region with respect to the first plurality of entire images, based on movements of a plurality of objects included in the first plurality of entire images. For example, the dynamic region may be a region for acquiring a wide viewing angle image. When a region including at least one of the plurality of objects has a speed greater than or equal to a movement speed of an object set by a user, the processor 310 may classify the region as the dynamic region.

The processor 310 may distinguish a static region with respect to the first plurality of entire images, based on the movements of the plurality of objects included in the first plurality of entire images. For example, the static region may be a region for acquiring a super-resolution image. When a region including at least one of the plurality of objects has a speed less than the movement speed of the object set by the user, the processor 310 may classify the region into the static region.

The processor 310 may control the optical microscope 100 so as to respectively irradiate lights having different amplitudes onto the dynamic region with respect to the first plurality of entire images and the static region with respect to the first plurality of entire images. For example, the processor 310 may control the optical microscope 100 so as to irradiate a light with a plane wave pattern onto the dynamic region. The processor 310 may control the optical microscope 100 so as to irradiate a light with a sine wave pattern onto the static region.

The processor 310 may generate a mask for distinguishing the dynamic region and the static region by using two consecutive images among the first plurality of entire images. For example, the mask may cover only the dynamic region. The mask may cover only the static region.

The processor 310 may receive a second image signal acquired by respectively irradiating lights having different amplitudes onto the dynamic region and the static region from the optical microscope 100.

The processor 310 may generate a second plurality of entire images by using the second image signal. For example, the second plurality of entire images may represent images including the entire acquired by irradiating lights having different amplitudes onto respective regions of the observation target.

The processor 310 may generate a plurality of static region images representing only the static region and a dynamic region image representing only the dynamic region, based on the second plurality of entire images and the mask.

The processor 310 may generate a final image with respect to a plurality of objects included in the observation target, based on the plurality of static region images and the dynamic region image. For example, the processor 310 may generate a super-resolution image with respect to the static region by using the plurality of static area images. The processor 310 may generate the final image by using the super-resolution image and the dynamic region image.

The processor 310 may generate a control signal for controlling the optical microscope 100. The processor 310 may transmit the control signal to the optical microscope 100.

The memory 350 may include volatile and/or nonvolatile memory. The memory 350 may store a command and/or data related to at least one of other components of the image acquisition apparatus 300.

The memory 350 may store software and/or a program. For example, the memory 350 may store an application and software for simultaneously acquiring a super-resolution image and a high-speed widefield image.

Figure 3:
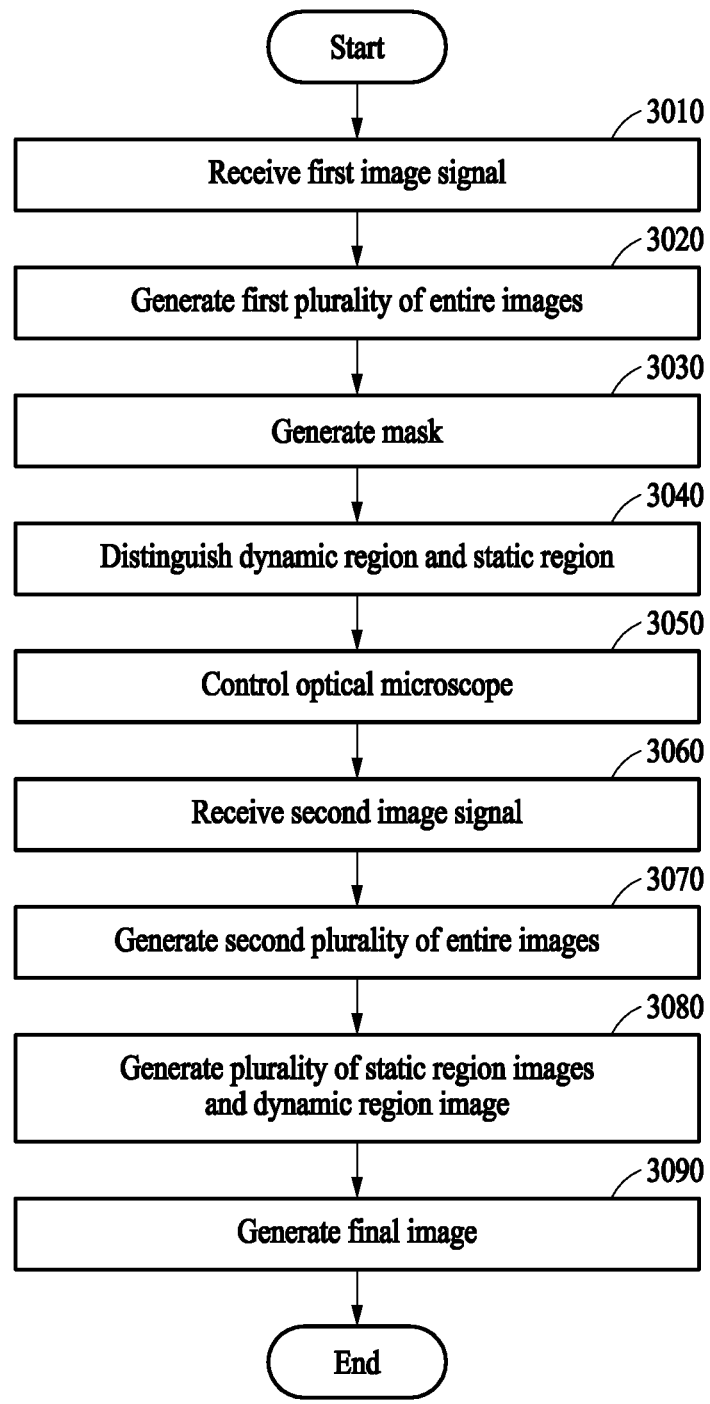
FIG. 3 is a flowchart illustrating an operation of an image acquisition apparatus.
Figure 4:
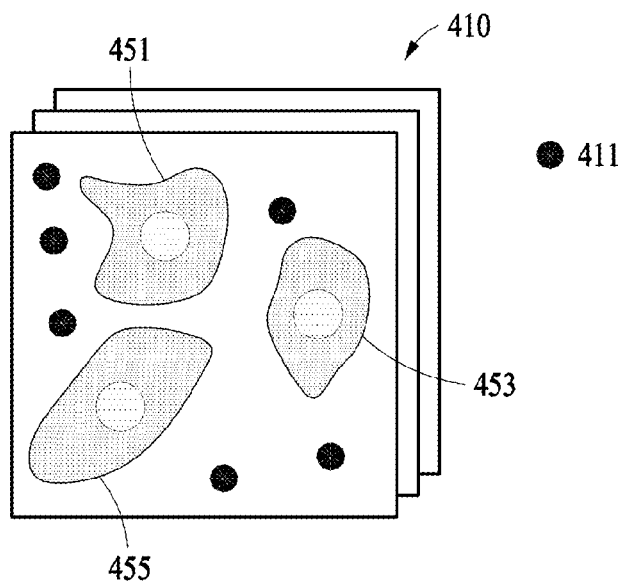
FIG. 4 illustrates an example of an entire image generated by an image acquisition apparatus.
Figure 5:
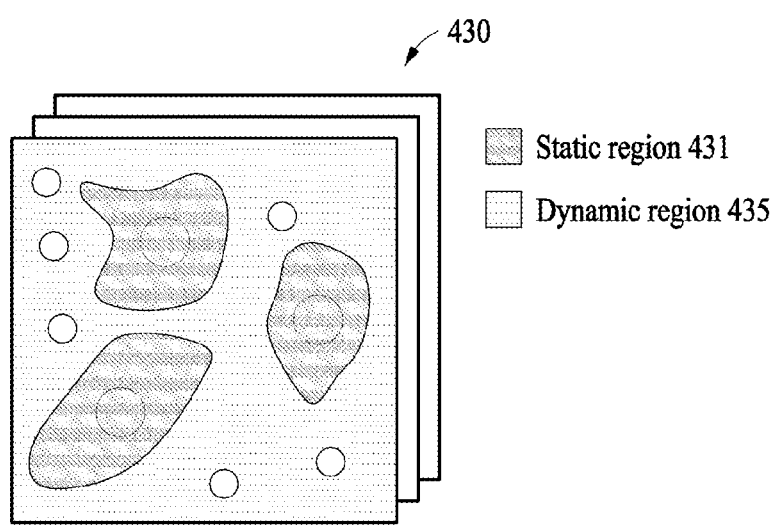
FIG. 5 illustrates an example in which an image generating apparatus distinguishes a dynamic region and a static region.
Figure 6:
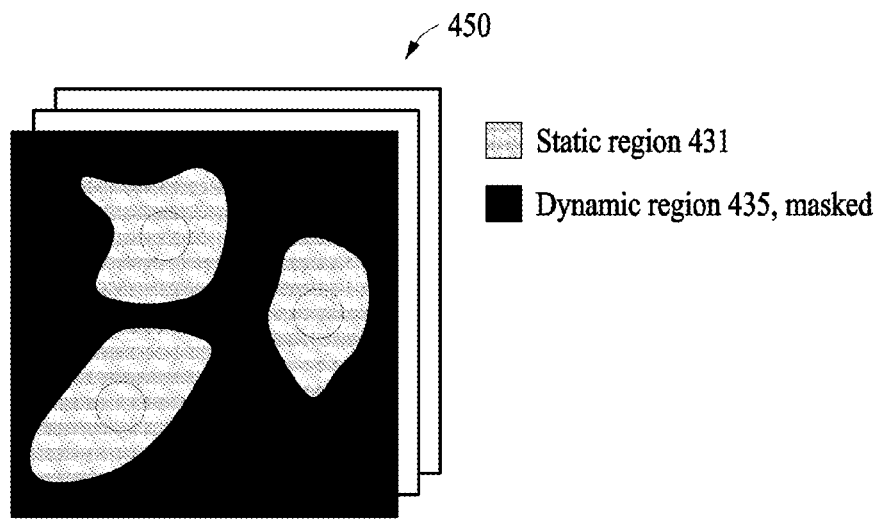
FIG. 6 illustrates an example in which an image generating apparatus covers a dynamic region through a mask.
Figure 7:
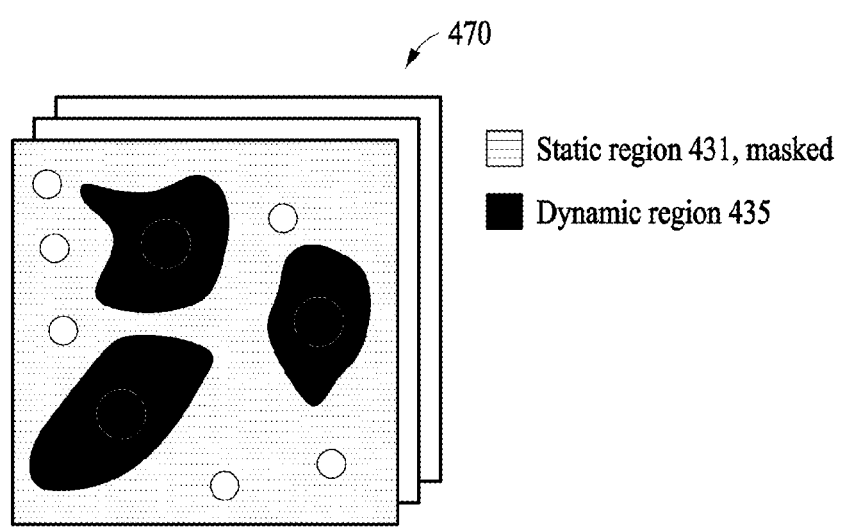
FIG. 7 illustrates an example in which an image generating apparatus covers a static region through a mask.

FIG. 3 is a flowchart illustrating an operation of an image acquisition apparatus. FIG. 4 illustrates an example of an entire image generated by an image acquisition apparatus. FIG. 5 illustrates an example in which an image generating apparatus distinguishes a dynamic region and a static region. FIG. 6 illustrates an example in which an image generating apparatus covers a dynamic region through a mask. FIG. 7 illustrates an example in which an image generating apparatus covers a static region through a mask.

The image acquisition apparatus 300 may receive a first image signal (3010).

The image acquisition apparatus 300 may generate a first plurality of entire images 410 by using the first image signal (3020). Referring to FIG. 4, the first plurality of entire images 410 may include a plurality of objects 411, 451, 453, and 455 that are observation targets.

The image acquisition apparatus 300 may generate a mask for distinguishing a dynamic region and a static region by using two consecutive images among the first plurality of entire images 410 (3030).

The image acquisition apparatus 300 may distinguish, based on movements of the plurality of objects 411, 451, 453, and 455 included in the first plurality of entire images 410, a dynamic region 435 with respect to the first plurality of entire images and a static region 431 with respect to the first plurality of entire images 410 (3040).

The image acquisition apparatus 300 may control the optical microscope 100 so as to respectively irradiate lights having different amplitudes onto the dynamic region 435 and the static region 431 (3050).

The image acquisition apparatus 300 may receive a second image signal acquired by respectively irradiating lights having different amplitudes onto the dynamic region 435 and the static region 431 from the optical microscope 100 (3060).

The image acquisition apparatus 300 may generate a second plurality of entire images 430 by using the second image signal (3070).

The image acquisition apparatus 300 may generate a plurality of static region images 450 representing only the static region and a dynamic region image 470 representing only the dynamic region, based on the second plurality of entire images 430 and the mask (3080). Referring to FIGS. 6 and 7, the image acquisition apparatus 300 may multiply the second plurality of entire images 430 by the mask, thereby separating a region irradiated with a sine wave pattern and a region irradiated with a plane wave from each other, as illustrated in FIGS. 6 and 7. The image acquisition apparatus 300 may construct a super-resolution image with respect to the region (static region 431) irradiated with the sine wave pattern, and accordingly an artifact may not be generated, thereby generating an image capable of accurately analyzing a microstructure of an observation target. The image acquisition apparatus 300 may analyze rapidly changing dynamics with respect to the region (dynamic region 435) irradiated with the plane wave, thereby generating an image capable of analyzing a correlation between the dynamics and a change of the microstructure.

The image acquisition apparatus 300 may generate a final image with respect to the plurality of objects, based on the plurality of static region images 450 and the dynamic region image 470 (3090). The image acquisition apparatus 300 may provide, through the final image, an image with a super-resolution capable of accurately analyzing the microstructure with respect to the static region 431, and capable of analyzing the rapidly changing dynamics with respect to the dynamic region 435.

Figure 8:
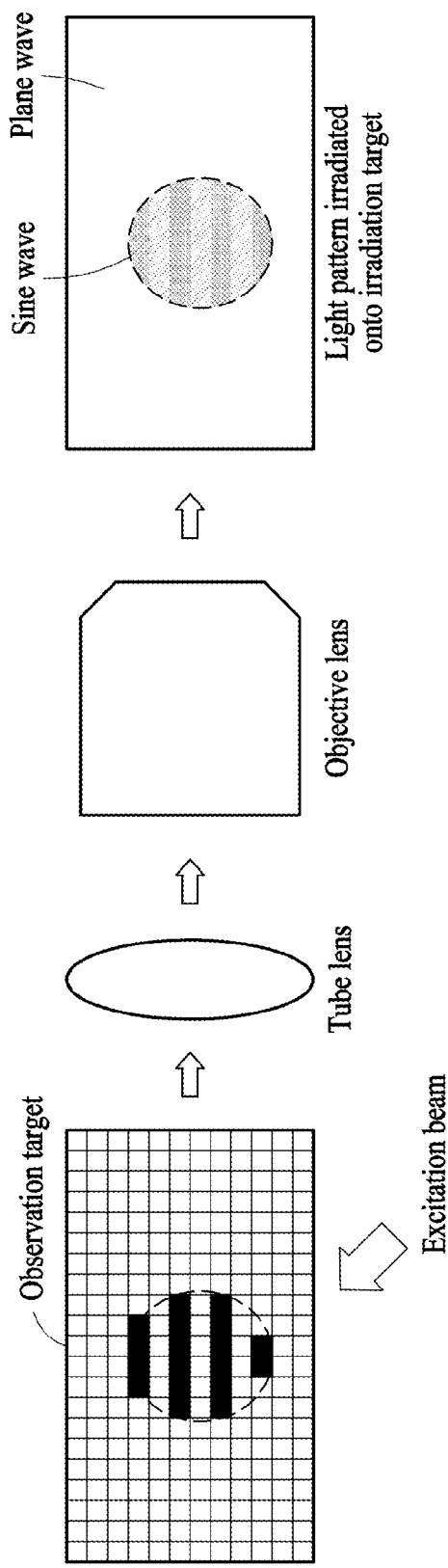
FIG. 8 is a diagram illustrating an example in which an optical microscope is implemented as a micromirror device.

FIG. 8 is a diagram illustrating an example in which an optical microscope is implemented as a micromirror device.

The optical microscope 100 may acquire, as an image signal, an image passing through a lens by irradiating an irradiation pattern having a spatial distribution of a sine wave intensity with respect to an observation target. The image acquired by the optical microscope 100 may be defined through Equation 1.

$$I(r) = \{O(r) \cdot P(r)\} * PSF \quad \text{[Equation 1]}$$

I(r) may represent an acquired image. O(r) may represent an observation target, P(r) and PSF may respectively represent an irradiation pattern and a point spread function expressed with respect to spatial coordinates r.

The image acquisition apparatus 300 may generate a super-resolution image by using respective images acquired by irradiating a plurality of sine wave patterns having different phases and directions.

However, when the observation target moves or is deformed, an artifact may occur within the generated super-resolution image, making it impossible to identify a complete image. In addition, accurately identifying even a surrounding region where a movement occurs may be impossible.

The image acquisition apparatus 300 may define the observation object that moves or is deformed (for example, a plurality of objects included in the observation object) by introducing time t, as indicated in Equation 2 below.

$$O(r,t) = O(r_s) + O(r_c, t) \quad \text{[Equation 2]}$$

O(r,t) may represent an entire region of an image. $O(r_s)$ may represent a region that does not move while acquiring a plurality of images required to construct a super-resolution image. $O(r_c, t)$ may represent a region that moves or is deformed while acquiring the plurality of images required to construct the super-resolution image.

With respect to the entire region of the image O(r,t), when there is no movement or deformation while acquiring the plurality of images required to construct the super-resolution image, temporal resolution may be degraded by the required number of pieces, however, spatial resolution may be improved up to two times. Conversely, with respect to the entire region of the image O(r,t), when all regions of the image move or are deformed, it is inevitable to acquire and observe a wide viewing angle image with spatial resolution corresponding to a diffraction limit.

The image acquisition apparatus 300 may spatially control an amplitude of a light irradiated by the optical microscope 100 when acquiring an image signal, through Equation 3.

$$P(r,t) = P_\sim(r_s,t) + P_{WF}(r_d)$$ [Equation 3]

$P_\sim$ may represent a sine wave pattern of the optical microscope 100. $P_{WF}$ may represent a plane wave pattern of the optical microscope 100. $r_s$ may represent a static region. $r_d$ may represent a dynamic region.

The image acquisition apparatus 300 may divide an image into a region corresponding to $O(r_s)$ that is a static region of the image and a region corresponding to $O(r_c,t)$ that is a dynamic region of the image, and may control the optical microscope 100 so as to respectively irradiates, onto the regions, a sine wave pattern used when the optical microscope 100 acquires a super-resolution image and a plane wave pattern used when the optical microscope 100 acquires a wide viewing angle image.

Referring to FIG. 8, the image acquisition apparatus 300 may control the optical microscope 100 so that respective micromirrors constituting the micromirror device and camera pixels are precisely matched. The image acquisition apparatus 300 may spatially control an amplitude of a light irradiated onto each region of the observation target through the control of the optical microscope 100. The optical microscope 100 may selectively irradiate a sine wave pattern and a plane wave within an image through the control of the image acquisition device 300.

The image acquisition apparatus 300 may derive Equation 4 by substituting Equation 2 and Equation 3 into Equation 1. The image acquisition apparatus 300 may irradiate a sine wave pattern used by an SIM with respect to a region that does not move, and a plane wave pattern with respect to a region that moves or is deformed, while acquiring a plurality of images required to construct one piece of super-resolution image through Equation 4.

$$I(r, t) = [\{O(r_s) + O(r_c, t)\} \cdot \{P_\sim(r_s, t) + P_{WF}(r_d)\}] * PSF = \\ \{O(r_s) \cdot P_\sim(r_s, t) + O(r_c, t) \cdot P_{WF}(r_d)\} * PSF$$ [Equation 4]

I(r,t) may represent a final image. $O(r_s)$ may represent a static region. $O(r_c,t)$ may represent a dynamic region. $P_\sim(r_s,t)$ may represent a sine wave pattern irradiated onto the static region. $P_{WF}(r_d)$ may represent a plane wave pattern irradiated onto the dynamic region. P(r) and PSF may respectively represent an irradiation pattern and a point spread function expressed with respect to spatial coordinates r.

For example, the image acquisition apparatus 300 may acquire a super-resolution image by implementing the SIM with respect to a part of an image (for example, a static region) while capturing rapidly changing dynamics by irradiating a plane wave onto the other region (for example, a dynamic region).

The units described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an OS and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion.

The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter.

The above-described hardware devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

Accordingly, other implementations are within the scope of the following claims.

What is claimed is:

1. An image acquisition method comprising:
receiving a first image signal from an optical microscope;
generating, by using the first image signal, a first plurality of entire images;
distinguishing, based on movements of a plurality of objects included in the first plurality of entire images, a dynamic region with respect to the first plurality of entire images and a static region with respect to the first plurality of entire images;
controlling the optical microscope so as to respectively irradiate lights having different amplitudes onto the dynamic region and the static region;
receiving, from the optical microscope, a second image signal acquired by respectively irradiating lights having different amplitudes irradiated onto the dynamic region and the static region;
generating, by using the second image signal, a second plurality of entire images;
generating, based on the second plurality of entire images and a mask for distinguishing the dynamic region and the static region, a plurality of static region images representing only the static region and a dynamic region image representing only the dynamic region; and
generating, based on the plurality of static region images and the dynamic region image, a final image with respect to the plurality of objects.

2. The image acquisition method of claim 1, further comprising:
generating the mask for distinguishing the dynamic region and the static region by using two consecutive images among the first plurality of entire images.

3. The image acquisition method of claim 1, wherein the generating of the final image comprises:
generating, by using the plurality of static region images, a super-resolution image with respect to the static region; and
generating, by using the super-resolution image and the dynamic region image, the final image.

4. The image acquisition method of claim 1, wherein the generating comprises:
controlling the optical microscope so as to irradiate a light with a plane wave pattern onto the dynamic region; and
controlling the optical microscope so as to irradiate a light with a sinusoidal wave pattern onto the static region.

5. The image acquisition method of claim 1, wherein the light is a light having an electromagnetic wave form in a predetermined wavelength range.

6. The image acquisition method of claim 1, wherein the first image signal is acquired by irradiating light with a plane wave pattern from the optical microscope.

7. The image acquisition method of claim 1, wherein the optical microscope is implemented as a digital micro-mirror device (DMD), a liquid crystal-based optical modulator, a micro electro mechanical systems (MEMS)-based optical modulator, or an LED.

8. An image acquisition apparatus comprising:
a memory configured to store instructions for simultaneously acquiring a super-resolution image and a high-speed widefield image; and
a processor configured to execute the instructions,
wherein, when the instructions are executed by the processor, the processor is configured to:
receive a first image signal from an optical microscope;
generate, by using the first image signal, a first plurality of entire images;
distinguish, based on movements of a plurality of objects included in the first plurality of entire images, a dynamic region with respect to the first plurality of entire images and a static region with respect to the first plurality of entire images;
control the optical microscope so as to respectively irradiate lights having different amplitudes onto the dynamic region and the static region;
receive, from the optical microscope, a second image signal acquired by respectively irradiating lights having different amplitudes onto the dynamic region and the static region;
generate, by using the second image signal, a second plurality of entire images;
generate, based on the second plurality of entire images and the mask for distinguishing the dynamic region and the static region, a plurality of static region images representing only the static region and a dynamic region image representing only the dynamic region; and
generate, based on the plurality of static region images and the dynamic region image, a final image with respect to the plurality of objects.

9. The image acquisition apparatus of claim 8, wherein the processor is configured to generate the mask for distinguishing the dynamic region and the static region by using two consecutive images among the first plurality of entire images.

10. The image acquisition apparatus of claim 8, wherein the processor is configured to:
generate, by using the plurality of static region images, a super-resolution image with respect to the static region; and
generate the final image by using the super-resolution image and the dynamic region image.

11. The image acquisition apparatus of claim 8, wherein the processor is configured to:
control the optical microscope so as to irradiate a light with a plane wave pattern onto the dynamic region; and
control the optical microscope so as to irradiate a light with a sinusoidal wave pattern onto the static region.

12. The image acquisition apparatus of claim 8, wherein the light is a light having an electromagnetic wave form in a predetermined wavelength range.

13. The image acquisition apparatus of claim 8, wherein the first image signal is acquired by irradiating light with a plane wave pattern from the optical microscope.

14. The image acquisition of claim 8, wherein the optical microscope is implemented as a DMD, a liquid crystal-based optical modulator, a MEMS-based optical modulator, or an LED.

* * * * *